(12) United States Patent
Reed et al.

(10) Patent No.: US 7,427,852 B2
(45) Date of Patent: Sep. 23, 2008

(54) LOW POWER CONTROL MODE FOR POWER SUPPLY

(75) Inventors: Byron M. Reed, Murphy, TX (US); Kevin M. Ovens, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 209 days.

(21) Appl. No.: 10/933,581

(22) Filed: Sep. 3, 2004

(65) Prior Publication Data

US 2006/0049800 A1 Mar. 9, 2006

(51) Int. Cl.
G05F 1/70 (2006.01)
H02J 7/00 (2006.01)

(52) U.S. Cl. .................. 323/207; 320/112; 320/128

(58) Field of Classification Search .......... 320/166, 320/112; 363/15; 323/283, 207
See application file for complete search history.

(56) References Cited

U.S. PATENT DOCUMENTS 6,363,021 B2 * 3/2002 Noh .................. 320/166
2003/0189443 A1 10/2003 Kunz et al.
2004/0008016 A1 * 1/2004 Sutardja et al. .......... 323/283

* cited by examiner

*Primary Examiner*—Gary L Laxton
*Assistant Examiner*—Yalkew Fantu
(74) *Attorney, Agent, or Firm*—Ronald O. Neerings; Wade J. Brady, III; Frederick J. Telecky, Jr.

(57) ABSTRACT

Systems and methods are disclosed to mitigate power consumption in a power supply, such as when operating in a low power mode. One aspect of the present invention relates to a control system for a power supply. The system includes a bias generator that provides a bias signal operative to charge a storage device based on a control signal. During a low power mode, a control system provides the control signal with a predetermined duty cycle that is functionally related to a storage capacity of the storage device.

19 Claims, 3 Drawing Sheets

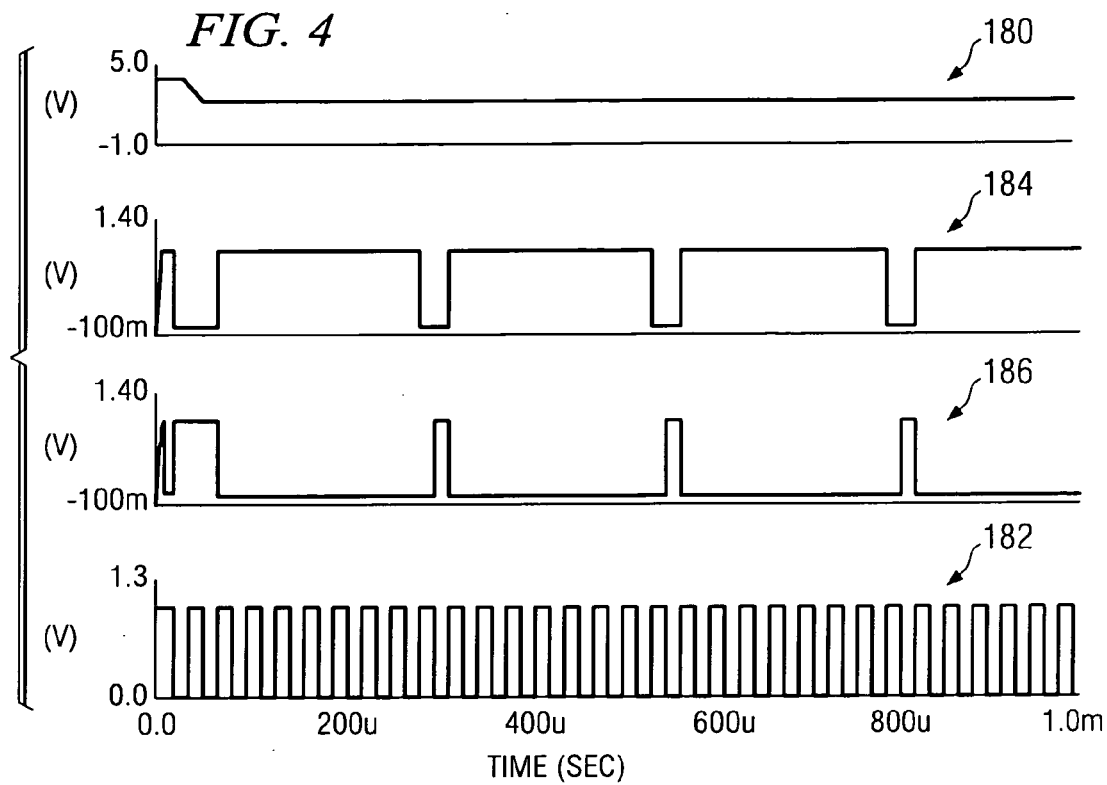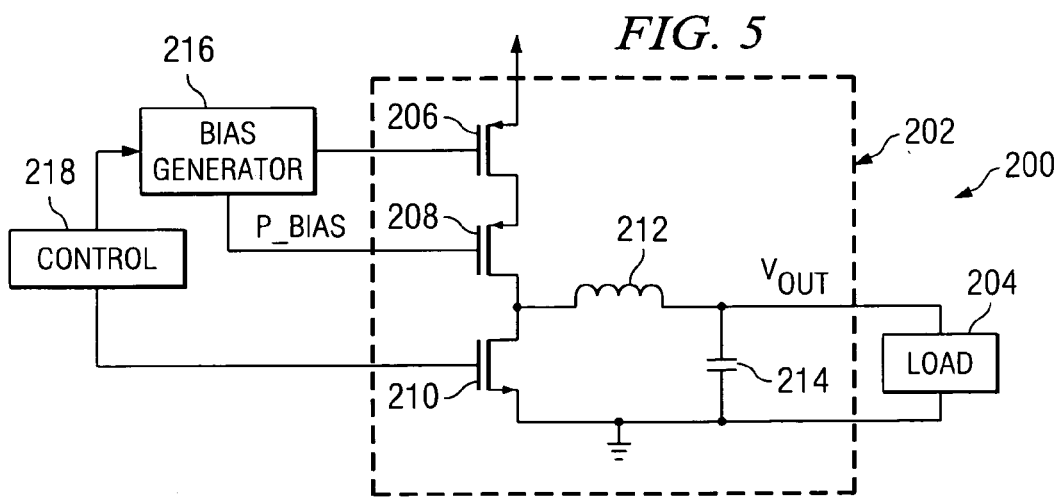

LOW POWER CONTROL MODE FOR POWER SUPPLY

TECHNICAL FIELD

This invention relates to integrated circuits, and more specifically relates to a low power control mode for a power supply.

BACKGROUND

Portable electronic devices continue to become increasingly complex. For example, mobile telephones are no longer limited to providing telephone functionality, but are also implementing multimedia and other functions. The increased complexity of portable devices imposes a tremendous burden on power consumption and battery lifetime. Despite the additional features being implemented in various devices, the manufacturers of these devices and their customers typically require substantially the same or even improved battery lifetime. Various types of power control systems have been developed that control the output voltage of a power supply.

One approach employs a power control system to operate a DC-DC buck converter for supplying the voltage to the core circuitry of the electronic device. FIG. 1 depicts an example of a power supply (e.g., including a DC-DC buck converter) 10 that can be used to provide regulated power for various applications. A control system 12 controls one or more switches of a switch network 14 to supply current to an associated load 16 through an inductor 18. A capacitor 20 is coupled across the load 16 for providing a corresponding output voltage. The control system 12 calculates an error voltage and adjusts the output voltage of the converter 10 accordingly. The control system 12, for example, operates in multiple operation modes, such as a low power mode and a normal, high power mode.

In view of the increased requirements of portable electronic devices, it is desirable to further reduce power consumption in the control of power supplies and converters.

SUMMARY

The present invention relates generally to an approach to mitigate power consumption in a power supply, such as when operating in a low power mode.

One aspect of the present invention relates to a control system for a power supply. The system includes a bias generator that provides a bias signal operative to charge a storage device based on a control signal. During a low power mode, a control system provides the control signal with a predetermined duty cycle that is functionally related to a storage capacity of the storage device.

For example, the storage device can be implemented as a capacitor that can maintain a charge at a desired level for maintaining a substantially fixed reference voltage for a time period. The control system thus activates the bias generator to recharge the capacitor to maintain the fixed reference voltage within an expected operating range. In one embodiment, the control system can implement periodic re-charging of the capacitor based on a pre-existing clock signal, which is generated and used by associated circuitry that is powered by the power supply system being controlled.

Another aspect of the present invention relates to a power supply system, that includes a converter (e.g., a buck converter). The converter includes a high-side switch, a low-side switch and an inductor coupled to a first node between the high-side switch and the low-side switch and an output node. An output capacitor is coupled to the output node to provide an output voltage for energizing an associated load. A bias generator provides a bias signal (e.g., a substantially fixed reference voltage) that is employed for modulating the at least one high-side switch according to an operating mode of the system. A storage device is coupled to an output of the bias generator, and the bias generator is activated during a low power mode to charge the storage device intermittently based on a storage capacity of the storage device.

Still another aspect of the present invention relates to a method for controlling a power supply system in a low power mode. The method includes deactivating a reference generator that is coupled to charge a storage device. The reference generator is intermittently strobed to re-charge the storage device according to a storage capacity of the storage device.

BRIEF DESCRIPTION OF THE DRAWINGS

FIG. 4 is a graph depicting signals associated with operation of a control system implemented in accordance with an aspect of the present invention.

FIG. 5 depicts an example of a power supply system that can be implemented in accordance with an aspect of the present invention.

DETAILED DESCRIPTION

Figure 1:
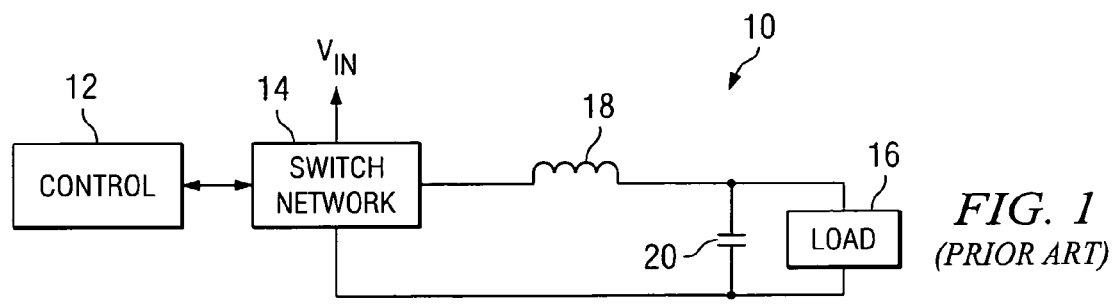
FIG. 1 depicts an example of a conventional power supply with a DC-DC buck converter.
Figure 2:
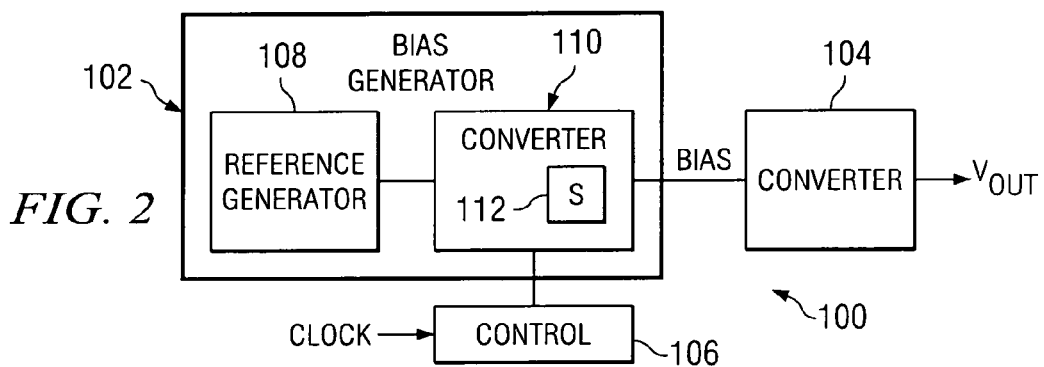
FIG. 2 depicts an example of a control and power supply system that can be implemented in accordance with an aspect of the present invention.

FIG. 2 depicts an example of a power supply system 100 that can be implemented in accordance with an aspect of the present invention. The power supply system 100 includes a bias generator 102 that is operative to provide a BIAS signal to an output converter 104. The BIAS signal can vary as a function of an operating mode of the system 100, such as may include a low power mode and at least a normal or high power mode. The output converter 104 is operative to provide an output signal $V_{OUT}$ based on the BIAS signal provided by the bias generator 102.

A control system 106 provides a control signal to the bias generator 102 based on which the BIAS signal is generated. The control system 106 can vary the control signal according to the operating mode of the system 100. In a low power mode, the control system 106 provides the control signal with a predetermined duty cycle that is functionally related to a storage capacity of part of the bias generator 102. The control system 106 can provide the duty cycle based on a CLOCK reference signal, such as can be provided by a clock generator (e.g., an oscillator) of associated circuitry (not shown) that is being powered by the output converter 104.

The bias generator 102 can include a reference generator 108 that is operative to provide a reference signal (e.g., a voltage) that is substantially independent of temperature. For example, the reference generator 108 can correspond to a band gap voltage generator or other corresponding circuitry that provides a temperature independent reference signal to a converter 110. The converter 110 provides the BIAS signal based on the reference signal and based on of the control signal provided by the control system 106. The converter 110 topology (e.g., voltage-to-voltage, current-to-voltage) can vary depending on the type of reference signal produced by the reference generator 108.

During a low power operating mode, for example, the control system 106 can provide the control signal to periodically enable and disable the converter 110 to maintain the BIAS signal to the output converter 104 at a predetermined low level. That is, the control system 106 can provide the control signal with a duty cycle that periodically activates the converter 110 to charge a storage component of the converter, schematically indicated at 112, to maintain the BIAS signal within an expected operating parameter for the low power mode. By periodically activating and deactivating the converter 110, power consumption of the bias generator 102 that is required to provide the BIAS signal to the output converter 104 can be significantly reduced relative to existing approaches that keep the converter 110 activated during the low power mode.

Figure 3:
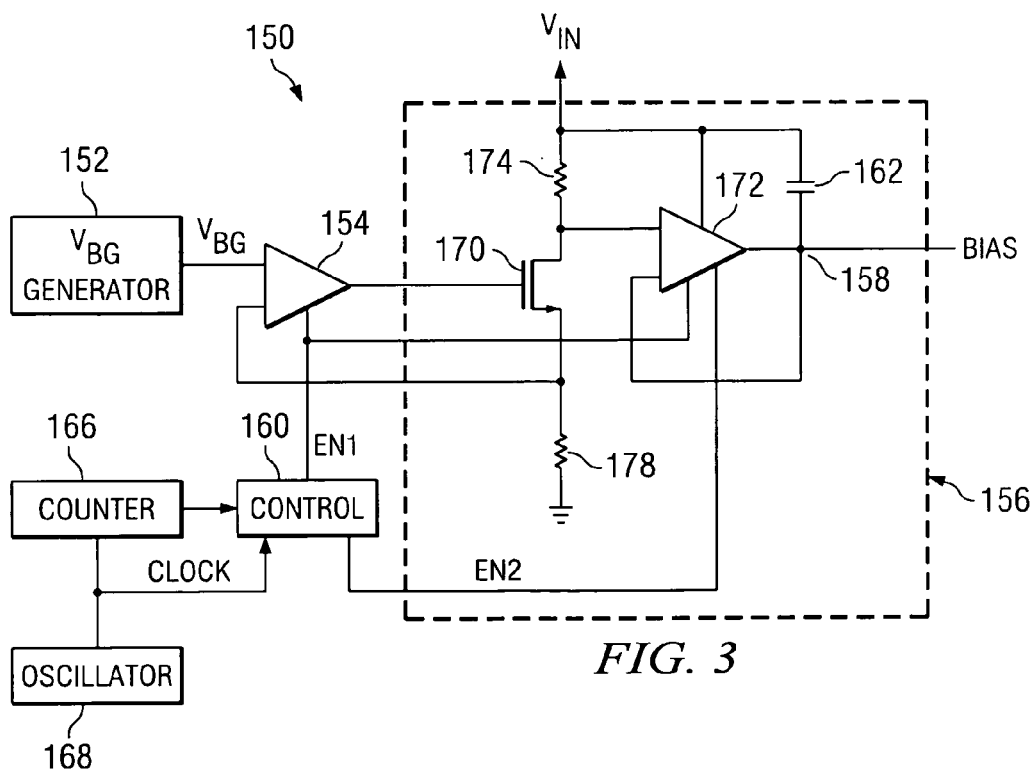
FIG. 3 depicts an example of a control system that can be implemented in accordance with an aspect of the present invention.

FIG. 3 depicts an example of a bias generation system 150 that can be implemented in accordance with an aspect of the present invention. The system 150 includes a band gap voltage ($V_{BG}$) generator 152 that is operative to provide a band gap reference voltage $V_{BG}$ to an input of an associated buffer (or comparator) 154. The buffer 154 is operative to drive a voltage-to-voltage converter 156 that in turn provides a BIAS signal at an output node 158. A control block 160 controls operation of the buffer 154 and the converter 156. In the example of FIG. 3, the control block 160 provides a pair of enable signals, indicated at EN1 and EN2. The control block 160 provides the enable signals EN1 and EN2 to periodically enable and disable the respective components of the system 150 to provide for desired periodic charging of an output storage device of the converter 156.

In the example of FIG. 3, the output storage device is depicted as a capacitor 162 that is coupled between the output node 158 and the $V_{IN}$. Those skilled in the art will appreciated that other components or combinations of components could also be employed to implement the storage device. The capacitor 162 can be internal to the converter 156 (as shown) or, alternatively, the capacitor can be implemented external to the circuitry (e.g., an integrated circuit) that forms the converter 156.

In the example depicted in FIG. 3, the control block 160 generates the enable signals EN1 and EN2 to have the appropriate duty cycles in the low power mode by implementing a counter 166 based on a CLOCK signal. The counter 166, for example, provides a counter output signal to the control block 160 after the counter reaches a predetermined value. The predetermined value of the counter 166 can be set to provide the enable signals EN1 and EN2 at a duty cycle that is required for maintaining a charge on the capacitor 162 within expected operating parameters.

By way of further example, the counter 166 can be implemented as a three bit counter such that the control block 160 can provide the respective enable signals EN1 and EN2 every eighth CLOCK cycle. Those skilled in the art will understand and appreciate that the duty cycle and counter values utilized to selectively enable and disable circuitry of the bias generation system 150 can vary according to the capacitance of the capacitor 162 as well as the rate of the CLOCK signal. According to one aspect of the present invention, the CLOCK signal can be provided by an oscillator 168, which can form part of an associated circuitry of an apparatus or system that is being powered by a power supply controlled by these bias signals. By leveraging existing circuitry to provide the CLOCK signal, the system 150 can be implemented with fewer components and thereby help reduce the associated manufacturing costs.

The voltage-to-voltage converter 156, for example, includes a transistor 170 connected in series with resistors 174 and 178 between $V_{IN}$ and electrical ground. The transistor 170 includes a control input (e.g., a gate) coupled to receive the output of the buffer 154. Another input of the buffer 154 is coupled to a node between the transistor 170 and the resistor 178 for providing a feedback signal to the buffer 154. The output of the buffer 154 controls a current through the transistor 170. The current through the transistor 170 varies based on a difference between VBG and the feedback signal and according to activation of the buffer in response to the enable signal EN 1.

The converter 156 also includes an output buffer 172 having an input coupled to receive an input voltage signal that is provided at a node coupled between the transistor 170 and the resistor 174. The input voltage to the output buffer 172 varies based on the current through the transistor 170, namely corresponding to the voltage drop across the resistor 174 (e.g., voltage=$V_{IN}-I_{TRANSISTOR\_170}*R_{174}$). Another input of the output buffer 172 is coupled to the output node 158. Capacitor 162 is coupled between the output node 158 and $V_{IN}$ for generating the desired BIAS signal at the node 158, which is a substantially fixed voltage that is less than $V_{IN}$. For example, the voltage potential between $V_{IN}$ (e.g., 5 V) and the BIAS signal (e.g., 3.5 V) can correspond to fixed voltage potential (e.g., about 1.5 V) that can be modulated for controlling an associated converter, such as a DC buck converter.

The buffer 172 can be implemented as a multistage buffer that receives both the enable signals EN1 and EN2 to control its output. A fractional duty cycle is selected to reduce power based on the storage capacitor 162. For instance, the enable signal EN1 can be provided for a first portion (e.g., about one-half) of every $N^{th}$ clock cycle to activate (e.g., power up) the output buffer 172, where N is a positive integer selected to periodically charge the capacitor to within expected operating parameters during the low power mode. Then, for a second portion of every $N^{th}$ clock cycle, the EN2 signal is also provided to operate the output buffer 172 for generating the BIAS signal at the output node 158. By providing the EN1 signal during the first portion of every $N^{th}$ clock cycle, the buffers 154 and 172 of the generator 150 are powered up to allow bias currents time to stabilize. During the subsequent portion of the $N^{th}$ clock cycle, the output buffer 172 is activated for re-charging the capacitor 162 to a desired level. Thus, N establishes a frequency at which the bias generator 150 is activated to recharge the capacitor 162. This process is repeated during the low power mode for generating the BIAS signal with reduced power requirements.

FIG. 4 depicts graphs of various signals in the circuit of FIG. 3 to demonstrate generation of a BIAS signal 180 according to one aspect of the present invention. Specifically, the example of FIG. 4 assumes, as described with respect to FIG. 3, that N=8, such that the bias generator is activated every $8^{th}$ clock cycle. FIG. 4 also depicts an example of a clock signal 182 for a 32 KHz clock signal. Thus, as represented in FIG. 4, a first enable signal 184 is activated every $8^{th}$ clock cycle. The enable signal 184, for example, corresponds to the EN1 signal of FIG. 3. In the example of FIG. 4, the enable signal 184 is a normally HIGH signal that can be pulled to a LOW voltage every $8^{th}$ clock cycle, such as to bias one or more associated PFET devices.

A second enable signal 186, corresponding EN2 of FIG. 3, is activated from a LOW voltage to a HIGH voltage for a second portion of every 8$^{th}$ clock cycle for activating an output buffer of a bias generator, such as for re-charging a capacitor or other storage device. Thus, the first portion of every 8$^{th}$ clock cycle is utilized for powering up the circuitry and allowing currents to stabilize prior to subsequent activation of the output buffer during the second portion of every 8$^{th}$ clock cycle for charging the output storage device. The storage device thus can discharge between adjacent re-charge cycles that occur when the output buffer is activated.

Those skilled in the art will understand and appreciate that the clock signal and corresponding duty cycle can be selected to minimize power consumption by intermittently strobing the bias generator for re-charging the output capacitor, as described herein. As a result, there can be a significant increase (e.g., about 80% or more) in power savings for standby power for generating the BIAS signal. As a result, battery life can be extended.

FIG. 5 depicts an example of a power supply system 200 that includes a DC-DC buck converter 202 operative to supply current to an associated load 204. Those skilled in the art will understand and appreciate that various different converter topologies can also be utilized, which may vary based on the particular application in which the power supply system 200 is being utilized.

In the example of FIG. 5, the converter 202 includes transistors 206, 208 and 210 coupled in series between an input voltage $V_{IN}$ and electrical ground. The transistors 206 and 208 correspond to high-side switches, which can be implemented as a P-metal oxide semiconductor FET (PMOSFET) devices. The transistor 208, which is normally activated to an ON condition, for example, can be implemented as a drain-extended PMOSFET to permit higher voltage operation. The transistor 210 corresponds to a low-side switch, which can be implemented as an NMOSFET device. An inductor 212 is coupled to a node interconnected between the transistors 208 and 210 and an output of the converter 202. The inductor 212 is connected to a capacitor 214 that is coupled in parallel with the load 204 between the output of the converter 202 and electrical ground. The current through the inductor thus is controlled to provide a corresponding output voltage $V_{OUT}$ according to the operating mode.

A bias generator 216 is operative to provide a BIAS signal at a desired fixed reference according to an aspect of the present invention. A control system 218 is coupled to control the bias generator 216 for generating the BIAS signal according to the operating mode of the power supply system 200. For example, the control system 218 can operate in two or more modes. For the example of two operating modes, a first mode can correspond to a pulse frequency modulation (PFM, also known as a pulse mode or burst mode) and a second mode can correspond to a pulse width modulation (PWM) mode. The PFM mode can be utilized to obtain high efficiency at low load currents, such as corresponding to a standby or low power mode, and the PWM mode can be used for high current or normal operating mode.

By way of example, during the low power mode, the BIAS signal is generated by periodic recharging of an output storage device of the bias generator 216 to maintain a desired voltage potential between $V_{IN}$ and the BIAS signal (e.g., a voltage swing of about 1.5 V). The transistor 208 is activated to an ON condition, such as by supplying the BIAS signal to the gate of such transistor. The transistor 206 is operated by appropriate modulation (e.g., PFM) of the gate between the BIAS signal and $V_{IN}$, such that a desired current is provided to the load 204 during the low power mode.

Further by way of further example, assuming that the converter 202 starts in the high current PWM mode, the control system 218 can transition the converter 202 to the PFM mode when the electrical current through the transistor 208 drops below a current threshold. The control system 218 operates the bias generator 216, such as every N$^{th}$ clock cycle, to generate and maintain the BIAS signal at a desired level, but with reduced operating power since at least an output stage of the bias generator is intermittently activated to re-charge a storage component thereof. As a result, the power consumption of the power supply system can be reduced based on an amount of time that the control system 218 deactivates the bias generator 216.

Figure 6:
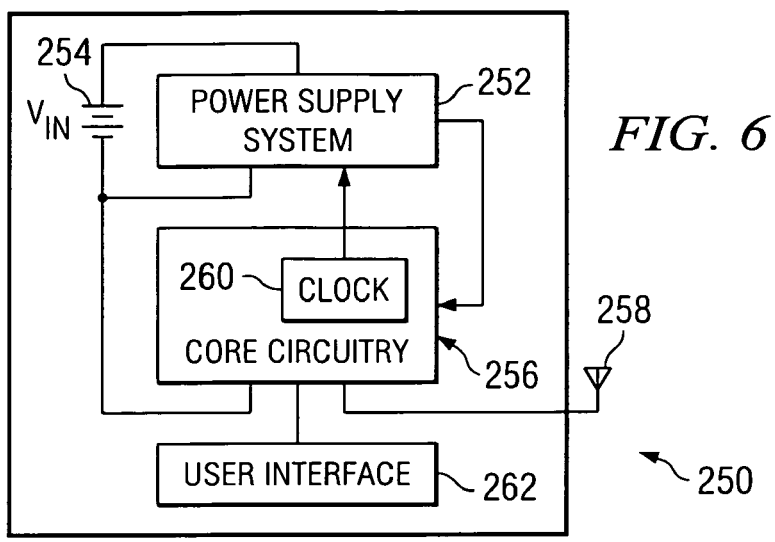
FIG. 6 depicts an example of a portable electronic device implementing a power supply system in accordance with an aspect of the present invention.

FIG. 6 depicts an example of a portable electronic apparatus 250, such as a mobile communications device (e.g., a cellular telephone, personal digital assistant, portable computer, video game console, and the like) implementing a power supply system 252 according to an aspect of the present invention. Those skilled in the art will understand and appreciate various implementations for the power supply system 252 based on the teachings contained herein, including but not limited to those shown and described with respect to FIGS. 2, 3, 5 and 7.

The power supply system 252 is coupled to a battery 254 for converting an input voltage $V_{IN}$ from the battery to a desired level. The power supply system 252 provides regulated power to associated core circuitry 256, which power can vary based on an operating mode of the apparatus 250. The core circuitry 256 can include analog or digital components configured and/or programmed to implement the functionality of the particular type of apparatus 250 being implemented.

In the example of FIG. 6, the core circuitry 256 is coupled to an antenna 258, such as for transmitting or receiving wireless communication signals. The core circuitry 256 also includes a clock (e.g., an oscillator) that generates a clock signal at a predetermined frequency (e.g., 32 KHz), which is also provided to the power supply system 252. As described herein, the power supply system 252 employs the clock signal to generate a bias signal during a low power mode, such as by activating a bias generator intermittently based on the clock signal. A user interface 262 can also be coupled to or be implemented as part of the core circuitry 256 for providing input instructions from a user to the core circuitry.

Figure 7:
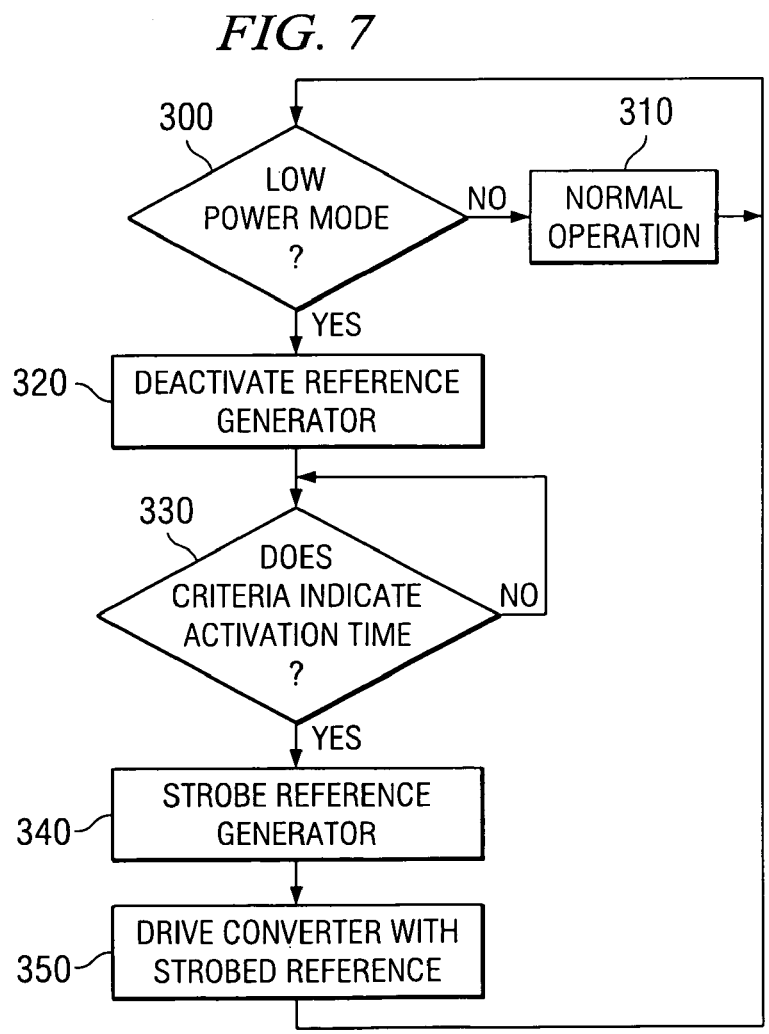
FIG. 7 depicts an example of a method for controlling a power supply in accordance with an aspect of the present invention.

FIG. 7 illustrates a methodology for controlling a power supply in accordance with an aspect of the present invention. While, for purposes of simplicity of explanation, the methodology 300 is shown and described as executing serially, it is to be understood and appreciated that the present invention is not limited by the order shown, as some aspects may, in accordance with the present invention, occur in different orders or concurrently from that shown and described herein. Moreover, not all features shown or described may be needed to implement a methodology in accordance with the present invention. Additionally, such methodology can be implemented in hardware (e.g., analog circuitry, digital circuitry or a combination thereof), software (e.g., running on a DSP or ASIC) or a combination of hardware and software.

The method of FIG. 7 can be utilized by a power supply system, for example, of a portable electronic device having at least a lower power mode (e.g., a standby mode) and one or more high power modes or normal modes. The methodology begins at 300 in which a determination is made as to whether the power supply system is operating in a low power mode. If there are no transitions to a lower power mode (NO), the methodology proceeds to 310 to continue or resume normal operation. The normal operation, for example, can be utilized to provide a regulated voltage or current to an associated load.

For example, normal operation can include pulse width modulating a switch network of a converter to source an amount of current and supply a load with a regulated voltage within expected operating parameters. From 310 the method returns to 300 to check for a transition to the lower power mode.

In response to a transition to the lower power mode (YES), the method proceeds from 300 to 320. At 320, an associated reference generator is deactivated. The reference generator corresponds to associated circuitry that provides a bias signal. The converter provides the regulated electrical energy (e.g., regulated voltage or current) to the associated load based on the BIAS signal, which can vary according to the operating mode of the system. By deactivating the reference generator, power consumption by the reference generator can be significantly reduced since no power is consumed during the deactivation phase.

At 330, a determination is made as to whether predetermined criteria indicates an activation time has been reached. The activation criteria can be established based on the storage capacity of an output storage device of the reference generator. As an example, the criteria can be implemented by a counter reaching a predetermined counter value corresponding to an amount of time required for the output storage device to discharge a defined amount. Alternatively, other mechanisms can be utilized to dynamically measure a stored charge or voltage of the storage device and utilize the measured charge or voltage of the storage device as the criteria that indicates an activation time. If the activation time has not been reached, the method can loop at 330 and maintain the reference generator in a deactivated state, thereby reducing power. If the criteria indicates an activation time has been reached (YES), the method proceeds to 340.

At 340, the reference generator is strobed to an activated condition to recharge the output storage device of the reference generator. By way of example, the strobing at 340 can be implemented as a multi-phase process, including an activation phase and an operation phase. The activation phase can be implemented for a first portion of an $N^{th}$ clock cycle to power up components of the reference generator and allow electrical current to stabilize therein. The operation phase can be employed to activate an output stage of a reference generator to recharge the storage device of the reference generator and maintain the bias reference signal within a desired operating range. Those skilled in the art will understand and appreciate that the requisite time for activating the reference generator in the low power mode generally depends on the storage capacity and recharge capabilities of the output storage device.

From 340 the methodology proceeds to 350 in which a converter (e.g., a DC-DC buck converter or other converter topology) is driven based on the reference signal being supplied. Those skilled in the art will understand and appreciate that a substantially constant low voltage reference signal can be provided to the converter during the low power mode based on implementing the method of FIG. 7. As a result, power consumption by the reference generator can be substantially reduced. Additionally, the overall battery lifetime can be increased proportional to the power savings associated with implementing the method.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, the systems and methods described herein can be applied to control power supplies of various types of electrical and electromechanical systems, such as control of motors (e.g., servo motors, stepper motors, linear motors) or portable electronic devices for which power conservation may be desired. Accordingly, the present invention is intended to embrace all such alterations, modifications, and variations that fall within the spirit and scope of the appended claims.

What is claimed is:

1. A system for controlling a power supply, comprising:
   a bias generator comprising:
   a first buffer that is configured to provide a buffer output signal based on a first enable signal; and
   a converter that provides a bias signal at an output node to which a storage device is coupled, the converter providing the bias signal based on the buffer output signal and based on a second enable signal; and
   a control system configured to provide the first enable signal to enable operation of the first buffer and to provide the second enable signal to enable operation of the converter, the controller providing the first enable signal for a first portion of every Nth clock cycle, and both the first and second enable signals are provided for a second portion of every Nth clock cycle, where N is a positive integer that establishes a frequency at which the bias generator is activated to recharge the storage device during a low power mode.

2. The system of claim 1, wherein the converter further comprises an output buffer that is coupled to provide the bias signal at an output node, the storage device being coupled to the output node, the output buffer being enabled, based on the second enable signal, to charge the storage device to maintain the bias signal within an expected operating level during the low power mode.

3. The system of claim 2, wherein the first enable signal is provided to the first buffer such that, during a first portion of the every Nth clock cycle, the first buffer and at least a portion of the converter are activated to receive power and to stabilize current flow therein prior to a subsequent portion of the every Nth clock cycle when the output buffer is activated in response to the second enable signal.

4. The system of claim 1, further comprising a counter configured to count clock cycles and to provide a counter output signal, the control system providing the first enable signal and the second enable signal during the low power mode based on the counter output signal.

5. The system of claim 4, further comprising a clock system that provides a clock signal at a predetermined frequency, the counter incrementing in response to the clock signal to provide the counter output signal.

6. The system of claim 1, further comprising a band gap reference generator that provides a band gap reference to the first buffer so that the first buffer generates the buffer output signal substantially independent of temperature variations.

7. The system of claim 1, wherein the storage device comprises a capacitor having a capacitance that defines the storage capacity.

8. The system of claim 1, wherein the latter portion of the every Nth clock cycle comprises a second half of the every Nth clock cycle.

9. The system of claim 1, wherein N>2.

10. A power supply control system, comprising:
    means for generating a bias signal during a low power mode;
    means for counting clock cycles and providing an output signal at every Nth clock cycle, where N is a positive integer selected to correspond to a storage capacity of an associated storage device; and means for, during the low power mode, controlling the means for generating the bias signal during the low power mode to charge the associated storage device intermittently at the every Nth clock cycle.

11. The system of claim 10, wherein the means for generating further comprises:

first means for buffering an input reference signal and for providing a buffer output signal; and second means for buffering an input signal corresponding to the buffer output signal and for providing the bias signal, wherein the means for controlling provides a first of a plurality of control signals to concurrently enable operation of both the first means for buffering and the second means for buffering and a second of a plurality of control signals to activate the second means for buffering to charge the associated storage device, the first of the plurality of control signals being provided at the every Nth clock cycle, the second of the plurality of control signals being provided to activate the second means for buffering at a latter portion of the every Nth clock cycle for generating the bias signal for charging the associated storage device.

12. The system of claim 11, wherein the latter portion of the every Nth clock cycle is a second half of the every Nth clock cycle.

13. The system of claim 10, wherein the means for controlling is configured to generate an enable signal to the means for generating to activate the means for generating such that the means for generating receives power and stabilizes current flow prior to the charging of the associated storage device.

14. The system of claim 10, wherein N>2.

15. A method for controlling a power supply system in a low power mode, comprising:

deactivating a reference generator that is coupled to charge a storage device;

initiating bias circuitry that interconnects the reference generator and the storage device at every Nth clock cycle, where N is a positive integer selected to correspond to a storage capacity of the storage device; and strobing the reference generator during a latter portion of the every Nth clock cycle to re-charge the storage device intermittently during the low power mode.

16. The method of claim 15, wherein the storage device comprises at least one capacitor coupled to an output stage of the reference generator, the initiating the bias circuitry comprising providing a first enable signal to enable operation of the reference generator, the strobing the reference generator comprising providing a second enable signal to activate the output stage for charging the at least one capacitor.

17. The method of claim 16, wherein providing the first enable signal further comprises providing power to the bias circuitry and stabilizing current flow within the bias circuitry prior to strobing the reference generator in response to the second enable signal.

18. The method of claim 15, wherein strobing the reference generator comprises strobing the reference generator at a second half of the every Nth clock cycle to re-charge the storage device.

19. The method of claim 15, wherein N>2.

* * * * *